United States Patent [19]
Wisseman et al.

[11] Patent Number: 5,892,869
[45] Date of Patent: Apr. 6, 1999

[54] OPTICAL-LOOP SIGNAL PROCESSING USING REFLECTION MECHANISMS

[75] Inventors: Philip Henry Wisseman, Hermosa Beach; Chung-Ching Shih, Palos Verdes Estates, both of Calif.

[73] Assignee: TRW Inc., Redondo Beach, Calif.

[21] Appl. No.: 896,124

[22] Filed: Jul. 17, 1997

Related U.S. Application Data

[62] Division of Ser. No. 668,806, Jun. 24, 1996, Pat. No. 5,838,851.

[51] Int. Cl.⁶ ........................................... G02B 6/26
[52] U.S. Cl. .................................. 385/37; 385/32
[58] Field of Search ................... 385/37, 39, 32, 385/42, 48

[56] References Cited

U.S. PATENT DOCUMENTS

| | | | |
|---|---|---|---|
| 4,557,552 | 12/1985 | Newton et al. | 385/32 |
| 4,676,585 | 6/1987 | Shaw et al. | 385/30 |
| 4,768,850 | 9/1988 | Moslehi et al. | 385/24 |
| 4,900,119 | 2/1990 | Hill et al. | 385/27 |
| 4,934,777 | 6/1990 | Jou et al. | 385/27 |
| 5,077,816 | 12/1991 | Glomb et al. | 385/37 |
| 5,153,933 | 10/1992 | Smith et al. | 385/27 |
| 5,166,940 | 11/1992 | Tumminelli et al. | 372/6 |
| 5,243,609 | 9/1993 | Huber | 372/6 |
| 5,271,024 | 12/1993 | Huber | 385/37 |
| 5,274,720 | 12/1993 | Yamamoto | 385/129 |
| 5,317,576 | 5/1994 | Leonberger et al. | 385/37 |
| 5,337,382 | 8/1994 | Mizrahi | 385/37 |
| 5,351,324 | 9/1994 | Forman | 383/37 |
| 5,367,586 | 11/1994 | Glance et al. | 385/24 |
| 5,410,404 | 4/1995 | Kersey et al. | 356/345 |
| 5,574,807 | 11/1996 | Snitzer | 385/24 |
| 5,636,021 | 6/1997 | Udd | 356/345 |

OTHER PUBLICATIONS

Moslehi et al., "Fiber–Optic Lattice Signal Processing," *Proceedings of the IEEE*, vol. 72, No. 7, Jul. 1984, pp. 909–930.

"Fabrication of $SiO_2$–$TiO_2$ Glass Planar Optical Waveguides by Flame Hydrolysis Deposition," Electronics Letters, vol. 19, No. 15, pp. 583–584, Jul. 21, 1983.

"Low–Loss High–Silica Single–Mode Channel Waveguides," Electronics Letters, vol. 22, No. 6, pp. 321 & 322, Mar. 13, 1986.

"Silica Waveguides on Silicon and Their Application to Integrated–Optic Components," Opt. Quantum Electron, vol.22, pp. 391–416, 1990.

*Primary Examiner*—Hung N. Ngo
*Attorney, Agent, or Firm*—Michael S. Yatsko

[57] ABSTRACT

Both recursive and non-recursive fiber-optic loop elements are cascaded to form various fiber-optic lattice configurations to form a fiber-optic signal processor for use in wideband applications capable of processing radio frequency (RF) signals. Each fiber-optic loop element includes a fiber-optic element, such as a monomode optical fiber or a monomode optical waveguide formed in a loop by way of a fiber-optic coupling device and one or more reflection mechanisms, such as a Bragg grating. In order to provide increased flexibility, the present invention allows the reflectivities of the reflection elements to be selected to provide additional flexibility in creating the frequency response characteristics of an optical signal processor.

16 Claims, 2 Drawing Sheets

OPTICAL-LOOP SIGNAL PROCESSING USING REFLECTION MECHANISMS

This is a divisional of U.S. patent application Ser. No. 08/668,806, filed Jun. 24, 1996, now entitled U.S. Pat. No. 5,838,851

BACKGROUND OF THE INVENTION

1. Field of the Invention

The present invention relates to a fiber-optic signal processing system and, more particularly, to two types of fiber-optic loop elements which can be combined in various configurations to form wideband fiber-optic signal processing systems capable of processing radio frequency (RF) signals, each fiber-optic loop element including a monomode optical fiber formed in a loop by way of a fiber-optic coupling device and including one or more reflection mechanisms, such as a Bragg grating, to provide greater flexibility than known systems in controlling the frequency response of the fiber-optic signal processing system.

2. Description of the Prior Art

The use of fiber-optic systems for wideband radio frequency (RF) signal transmission provides several advantages over conventional RF transmission systems including wider bandwidth, less weight and smaller size. Because of the limited utility of known fiber-optic signal processing systems, fiber-optic RF transmission signals are known to be converted to the electrical domain for various signal processing functions, including filtering and equalization. Unfortunately, because of the limited bandwidth capability of the electronic components used for such electronic signal processing, the bandwidth of the fiber-optic system is limited.

Fiber-optic signal processing methods are known; however, as discussed above, their utility is rather limited. Such fiber-optic signal processing systems normally include a monomode fiber formed in various configurations, as generally described in "Fiber-optic Lattice Signal Processing" by B. Moslehi, J. W. Goodwin, M. Tur, and H. J. Shaw, *Proceedings of the IEEE*, Vol. 72, No. 7, July 1984, pp. 909–930, hereby incorporated by reference. As discussed in detail in "Fiber-optic Lattice Signal Processing", such lattice filters are known to be configured as either recirculating (feed backward) or non-circulating (feed forward). An important aspect of the lattice filters is the ability to cascade such filters to create various frequency response characteristics of the filter.

As discussed in U.S. Pat. No. 4,768,850, the frequency response of such lattice filters can be controlled somewhat by controlling the delays in order to manipulate the poles and zeroes of the transfer function to create filters having different frequency response (characteristics. However, control of the delays provides only limited flexibility in creating various frequency response characteristics.

Fiber-optic signal processing systems are known to be based upon discrete time techniques and, in particular, are based upon time delay lines and weighted tapping configurations. A time delay line involves adding of predetermined length of fiber to the system in order to create a delay. For example, a fiber about 1 meter long with a refractive index of about 1.5 will have a propagation delay of about 5 nanoseconds. Examples of systems which include time delay lines are disclosed in U.S. Pat. Nos. 4,676,585, 4,934,777 and 5,367,586.

As mentioned above, weighted tap delays are also known to be used in fiber-optic signal processing systems. A weighted tap delay is configured such that the output signal is available at several different points, the distance between which provide a delay time equal to the period of the fundamental frequency of the input signal. As such, the output signal is normally a constant multiple of the input signal. An example of such a system is disclosed in U.S. Pat. No. 4,557,552.

SUMMARY OF THE INVENTION

It is an object of the present invention to solve various problems of the prior art.

It is yet another object of the present invention to provide increased flexibility in the design of fiber-optic signal processing systems.

Briefly, the present invention relates to recursive and non-recursive fiber-optic loop elements which can be cascaded to form various configurations to form a fiber-optic signal processor for use in wide band applications capable of processing radio frequency (RF) signals. Each fiber-optic loop element includes a monomode fiber or any other monomode optical waveguide formed in a loop by way of a fiber-optic coupling device and one or more reflection mechanisms, such as Bragg gratings. In addition to providing the ability to vary the frequency response of the filter by manipulation of the delays, the present invention allows the reflectivities of the reflection elements to be selected to provide additional flexibility in creating frequency response characteristics of a fiber-optic signal processor.

DESCRIPTION OF THE DRAWINGS

These and other objects of the present invention will be readily understood with reference to the following specification and attached drawing, wherein.

DETAILED DESCRIPTION OF THE INVENTION

Figure 1:
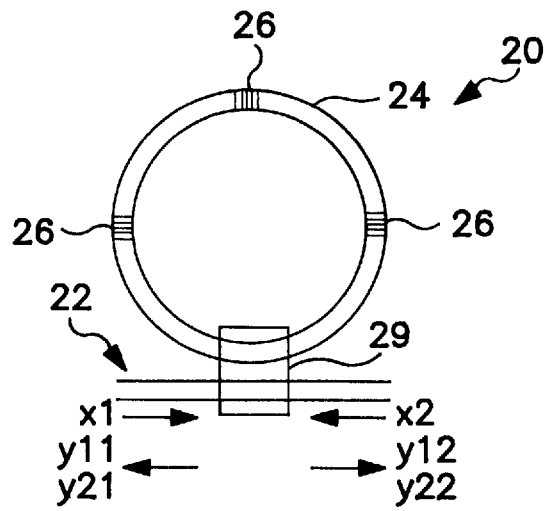
FIG. 1 is a schematic representation of a recursive fiber-optic loop element in accordance with the present invention.
Figure 2:
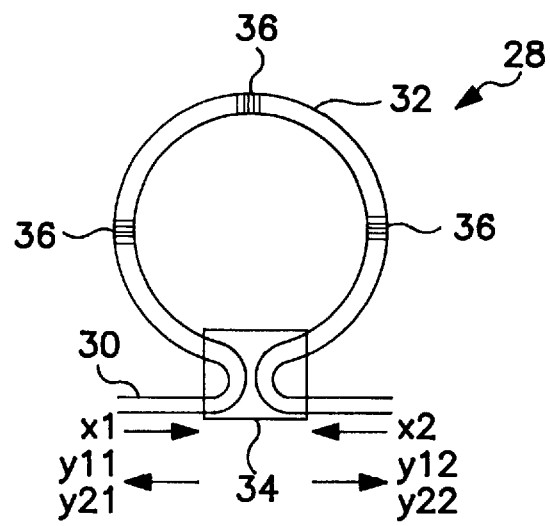
FIG. 2 is a schematic representation of a non-recursive fiber-optic loop element in accordance with the present invention.

The fiber-optic signal processing systems in accordance with the present invention are based upon the two fiber-optic loop elements, illustrated in FIGS. 1 and 2, which can be cascaded to form various configurations of fiber-optic signal processors as illustrated in FIGS. 3–6. It should be noted, however, that the configurations illustrated in FIGS. 3–6 are merely exemplary, and that virtually any configuration which includes one or more of the fiber-optic loop elements illustrated in FIGS. 1 and 2 are within the broad scope of the invention.

The fiber-optic loop element illustrated in FIG. 1, generally identified with the reference numeral 20, includes a monomode optical fiber 22 having inputs x1 and x2 or any other monomode optical waveguide such as disclosed in "Fabrication of $SiO_2$-$TiO_2$ Glass Planar Optical waveguides by Flame Hydrolysis Deposition," *Electronics Letters*, Vol. 19, No. 15, pp. 583, 584, Jul. 21, 1983; "Low-Loss High-Silica Single-Mode Channel Waveguides," *Electronics Letters*, Vol. 22, No. 6, pp. 321 & 322, Mar. 13, 1986; and "Silica Waveguides on Silicon and Their Application to Integrated-Optic Components," *Opt. Quantum Electron*, Vol. 22, pp. 391–416, 1990, herein referred to as an optical element. A fiber-optic loop 24, formed as an endless loop from another monomode optical fiber, is coupled to the fiber 22 by way of a fiber-optic coupling device 27 forming a recursive configuration to provide an infinite impulse response. An important aspect of the invention relates to the reflection mechanisms 26 disposed within the loop 24. As shown, the reflection mechanisms 26 are separated from each other in regular intervals to introduce time delays in the mixing process. For example, as shown, the reflection mechanisms are shown at zero degrees, 90°, and 180° relative to the fiber-optic coupling device 27. However, other configurations of the reflection mechanisms are considered within the broad scope of the present invention.

FIG. 2 illustrates a non-recursive fiber-optic loop element in accordance with the present invention for providing a finite impulse response. The non-recursive fiber-optic loop element is generally identified with the reference numeral 28 and includes a monomode fiber or monomode optical waveguide 30 configured in a loop 32 by way of a fiber-optic coupling device 34. The loop 32 includes a plurality of reflection mechanisms 36 which may be spaced about the loop 32 at regular intervals as shown.

Each of the fiber-optic loop elements 20 and 28 is adapted to receive RF signals modulated on optical carrier at either of its inputs x1 or x2. As shown in FIGS. 1 and 2, an RF signal applied to the input x1 will produce output signals y11 and y12, while a signal applied to the input x2 will produce output signals y21 and y22. Depending upon the particular processor configuration, the reverse propagating output signals may be separated from the input signals using various known devices, including an optical circulator.

An important aspect of the invention is the inclusion of the reflection mechanisms 26, 36 in the loops 24, 32 respectively. Various devices may be used as the reflection mechanisms 26 and 36, such as a Bragg grating. A fiber Bragg grating is a pattern of variations in the index of refraction of an optical fiber that are formed within the fiber core. Such gratings can be fabricated using a variety of techniques which typically involve the formation of a fringe pattern of ultraviolet light incident on the fiber core to produce a desired index of refraction pattern. In operation, light propagating through the fiber is reflected by the grating, if the wavelength of light satisfies the Bragg condition; namely, that twice the grating period is equal to an integer multiple of the optical wavelength. Light at a sufficiently different wavelength than a multiple of twice the fringe period is transmitted through the grating undisturbed. The reflectivity and bandwidth of the grating determined by the length of the grating and the fringe pattern amplitude, as well as the spacing profile.

The function of the Bragg gratings in the loop structures 24 and 32 is to act as a wavelength selective mirror within the fiber. In the absence of the fiber gratings 26 and 36 within the fibers, the fiber loop elements would produce a filter response with a fundamental frequency determined by the propagation time of the fiber loop. The addition of the Bragg gratings within the loop adds additional tap positions. These additional tap positions increase the number of poles and zeroes that can be provided by a single loop element. With the proper selection of the position the reflectivity of the gratings, higher order filter functions can be produced with fewer loop elements, thus reducing the required number of fiber-optic coupling devices. Decreasing the number of fiber-optic coupling devices also has an advantage of decreasing the system complexity, as well as the optical losses.

The use of Bragg gratings for the reflection mechanisms 26 and 36 provides various advantages. First, the Bragg gratings are formed directly within the fiber core, thus eliminating alignment problems that would be associated with either splicing or adding optical elements, as well as lowering the optical losses of the system. Such a configuration allows additional tap positions to be used in order to create higher order filter functions. In addition, Bragg gratings are wavelength selective. As such, different filter functions can be created within the same fiber structure by changing the wavelength of the optical carrier. The ability to change the response significantly enhances the functionality of the systems that incorporate the filters. Finally, the Bragg gratings allow the formation of tap responses that are not possible with various alternative approaches. For example, if the fiber gratings are formed in a fiber that is birefringent, the changes in index and thus the reflectivity at a particular optical carrier wavelength will be different as a function of polarization. As such, a system incorporating such a fiber could be used in conjunction with a polarization shifting or polarization selecting element to change the tap weight as a function of the propagation direction of the optical signal or the number of times the signal has travelled through the loop. In addition, a Bragg grating with an asymmetric amplitude profile and/or a chirped grating period could also be used to provide a different tap weight as a function of the propagation direction of the optical signal. As such, the Bragg gratings offer increased functionality relative to known systems.

The reflectivities of the Bragg gratings are selected independently to create the desired frequency response, with relatively low reflectivities relative to the system disclosed in U.S. Pat. No. 4,900,119, to provide greater flexibility. Since the signal processing is performed at the RF frequency, the grating separations need only be controlled within a fraction of the optical pulse length, as opposed to a fraction of the optical wavelength.

The number, location and reflectivity of the Bragg gratings, the total loop delay as well as the ratio of the fiber coupling devices 26 and 34, can all be independently varied to allow changes in the number and placement of the poles and zeroes in the transfer functions for both forward and reverse output signals. The use of the fiber Bragg gratings allows the use of laser wavelength to select different time delays and grating reflectivities to produce different transfer functions. The fiber Bragg gratings are made to reflect light at the optical carrier wavelength with a spectral width greater than twice the RF bandwidth.

The optical source is required to have a coherence length greater than the Bragg grating length but less than twice the minimum separation between the gratings or the coupler. The maximum coherence length is limited to avoid optical interference effects while the minimum coherence length ensures effective reflection from the gratings. The source spectral width, which corresponds to the inverse of the coherence length, should be sufficiently narrow to allow the required separation between the different wavelengths used to select different processor functions.

In addition to Bragg gratings, fiber mirrors can also be used for the reflection mechanisms 26 and 36. Such fiber mirrors within the fibers can be formed by a number of techniques, including dielectric or metallic coatings, air gaps, or other methods to form steps in the index of refraction. However, such techniques generally require the use of either fiber splicing or additional optical elements. Fabry-Perot cavities, as well as index steps, can also be used as the reflection mechanisms 26 and 36.

The fiber loops can be formed using a wide variety of coupler technologies, including fused or polished fiber couplers, as well as integrated waveguide couplers. The couplers may also incorporate either fixed or variable coupling ratios, as well as wavelength selective, polarization maintaining, or polarization selective techniques.

Referring to FIG. 1, a fiber-optic loop element 20 is configured as a recursive element, wherein light at either input x1 or x2 will recirculate through the loop, thus producing an infinite impulse response. The non-recursive fiber-optic loop element 28 is configured such that the light does not recirculate and thus producing a finite impulse response. The recursive loop element 20, as well as the non-recursive loop element 28, produce different filter responses and thus can be used as basic building blocks to provide more complex processor structures.

FIGS. 3–6 illustrate various combinations of the loop elements 20 and 28 to create various fiber lattice structures (fiber-optic signal processing systems) to provide various poles and zeroes, and thus greater control of the transfer function of the overall lattice structures. As illustrated in FIGS. 3–6, the lattice structures may be combined in either series or parallel, in which one or more of each of the loop elements 20 and 28 are combined with one another.

FIGS. 3–6 illustrate exemplary examples of possible combinations of the loop elements 20 and 28 that can be combined to form relatively complex fiber-optic signal processing systems using the basic loop elements 20 and 28. FIGS. 3–6 illustrate various series and parallel combinations of the loop elements 20 and 28. For both the series and parallel lattice structures, any combination of the basic loop elements 20 and 28 may be used with the number and type of loop elements 20 and 28 determined by the desired filtered response. The configuration of each element in the resulting lattice structure (i.e., number of reflection mechanisms 26, 36), placement of reflection elements 26, 36, as well as the reflectivity of the reflection elements 26, 36, coupler type and coupling ratio may also vary. In addition, it should be clear that various combinations of series and parallel lattice structures may be combined in a single lattice structure, depending upon the particular frequency response required.

Figure 3:
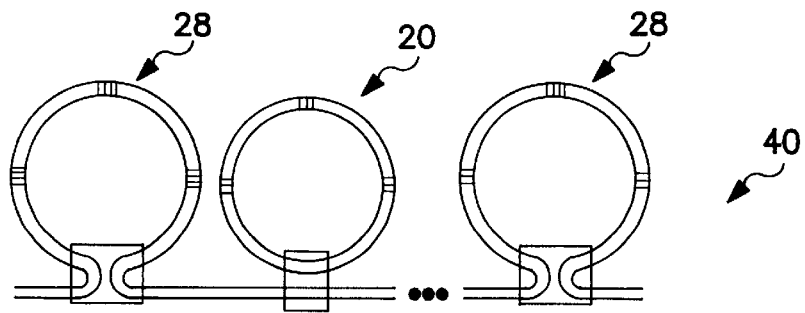
FIG. 3 is a schematic representation of recursive and non-recursive fiber-optic loop elements illustrated in FIGS. 1 and 2, shown cascaded in series.
Figure 4:
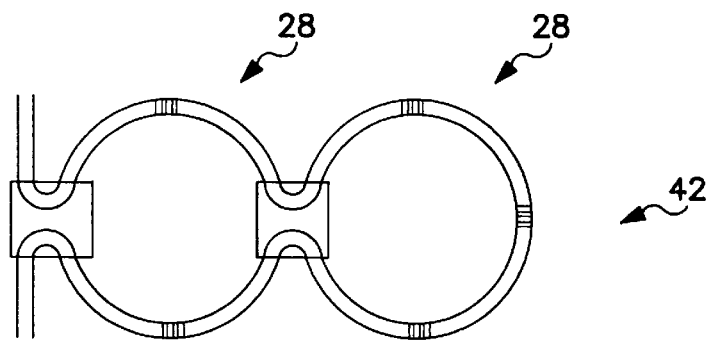
FIG. 4 is a schematic diagram of a fiber-optic signal processor in accordance with the present invention shown with two of the non-recursive fiber-optic loop elements cascaded in parallel.
Figure 5:
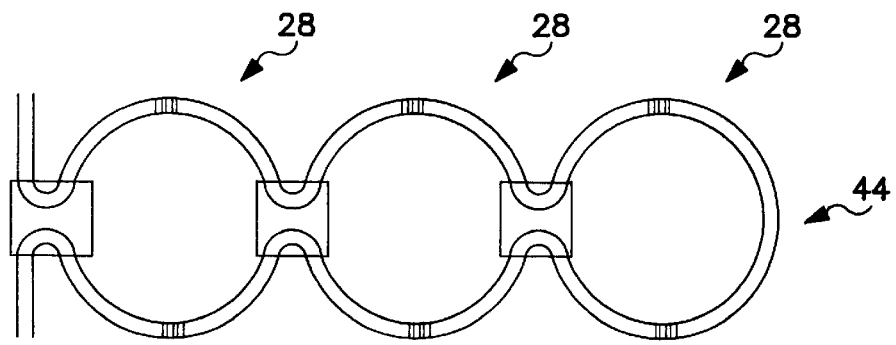
FIG. 5 is similar to FIG. 4, except three of the non-recursive fiber-optic loop elements are cascaded in parallel.
Figure 6:
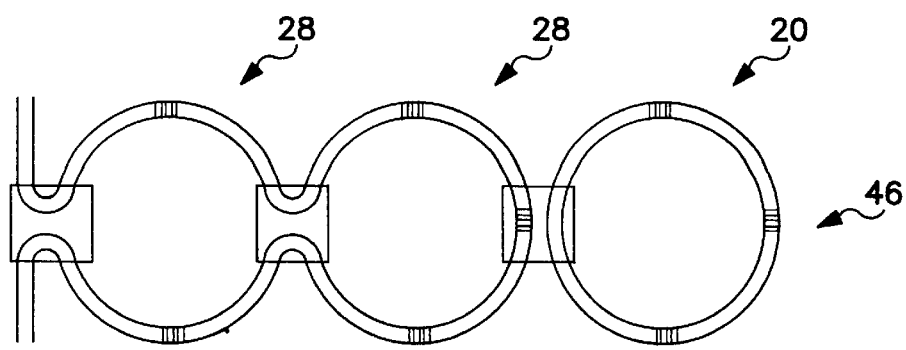
FIG. 6 is a schematic representation of a fiber-optic signal processor in accordance with the present invention shown with a recursive fiber-optic loop element and two non-recursive fiber-optic loop elements cascaded in parallel.

Referring to FIG. 3, one or more recursive elements 20 are cascaded in series with one or more non-recursive elements 28 in a fiber lattice structure to form a fiber-optic signal processing system 40. FIGS. 4–6 illustrate parallel combinations of the fiber-optic loop elements 20 and 28. In particular, FIG. 4 illustrates two non-recursive loop elements 28 cascaded in parallel to form a fiber-optic signal processing system 42. FIG. 5 is similar to FIG. 4 and illustrates three non-recursive loop elements 28 combined in parallel to form a fiber-optic signal processing system 44. FIG. 6 illustrates the parallel combination of two non-recursive loop elements 28 with a recursive loop element 20 to form a fiber-optic signal processing system 46.

Due to the positive nature of light, only positive top weights are implemented, using either single or cascaded loop elements 20 and 28 as discussed above. The resulting poles and zeroes in the RF transfer function will produce low pass or all pass (phase only) responses. However, negative tap weights are also contemplated using two fiber-optic signal processing systems with one either driven by an inverted input or with an inverting detector at the output, such that the contributions from the two fiber-optic signal processing systems subtract when combined. Such configuration will allow the implementation of band pass, as well as high pass, RF transfer functions.

Additional variations are also possible in which the fiber-optic coupling device 27, 34 used to form the loop structure is replaced with an optical switch or a wavelength selective coupler. Such a configuration allows additional flexibility in reconfiguring the fiber-optic signal processing system for different responses. Such a configuration could also be used to select between either positive or negative taps for a particular tap position when used in a dual configuration as described above. Finally, semiconductor or fiber-optic amplifiers may also be used in the fiber structures to improve the optical efficiency and allow additional loop elements 20 and 28 to be cascaded.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An optical signal processing system, comprising:
   a plurality of optical elements, said optical elements formed in a predetermined loop by way of a predetermined optical coupling device; and
   one or more predetermined reflection mechanisms formed in said loop;
   means for enabling said optical loop elements to be optically coupled together in a parallel configuration, wherein said plurality of optical elements include at least one recursive and one non-recursive configurations.

2. The optical signal processing system as recited in claim 1, wherein said plurality includes two non-recursive and one recursive loop configurations.

3. The optical signal processing system as recited in claim 1, wherein said predetermined reflection mechanisms include one or more Bragg gratings.

4. The optical signal processing system as recited in claim 1, wherein said predetermined reflection mechanisms are relative equally spaced around said loop.

5. The optical signal processing system as recited in claim 1, wherein said optical element is a monomode optical fiber.

6. The optical signal processing system as recited in claim 1, wherein said optical element is a monomode optical waveguide.

7. An optical signal processing system, comprising:
   a plurality of optical elements, said optical elements including at least one recursive configuration and at least one non-recursive configuration;
   means for coupling said plurality of optical elements in a parallel configuration; and
   one or more predetermined reflection mechanisms formed in said loop, wherein said predetermined reflection mechanisms include one or more Fabry-Perot cavities.

8. An optical signal processing system for processing RF signals, said processing system comprising:

a plurality of optical elements;

means for configuring one or more of said optical elements in a loop for producing a finite impulse response; and means for configuring one or more of said optical elements in a loop for producing an infinite impulse response;

means for enabling said optical elements to be coupled together in a parallel configuration;

means including a predetermined reflection mechanism formed in said loops for enabling the frequency response of said optical signal processing system to be varied by varying the characteristics of said predetermined reflection mechanism.

9. The optical signal processing system as recited in claim 8, wherein said predetermined reflection mechanism includes one or more Bragg gratings.

10. The optical signal processing system as recited in claim 8, wherein said predetermined reflection mechanism includes two or more Bragg gratings.

11. The optical signal processing system as recited in claim 10, wherein said two or more Bragg gratings are equally spaced in said loop.

12. The optical signal processing system as recited in claim 8, wherein said one or more optical elements includes a monomode optical fiber.

13. The optical signal processing system as recited in claim 8, wherein said one or more optical elements includes a monomode optical waveguide.

14. An optical signal processing system, comprising:

a plurality of optical elements, said optical elements including at least one recursive configuration and at least one non-recursive configuration;

means for coupling said plurality of optical elements in a parallel configuration; and one or more predetermined reflection mechanisms formed in said loop, wherein at least one of said one or more predetermined reflection mechanisms are formed from a birefringent fiber.

15. An optical signal processing system, comprising:

a plurality of optical elements, said optical elements including at least one recursive configuration and at least one non-recursive configuration;

means for coupling said plurality of optical elements in a parallel configuration;

one or more predetermined reflection mechanisms formed in said loop; and means for selecting light of a predetermined polarization.

16. An optical signal processing system, comprising:

a plurality of optical elements, said optical elements including at least one recursive configuration and at least one non-recursive configuration;

means for coupling said plurality of optical elements in a parallel configuration;

one or more predetermined reflection mechanisms formed in said loop; and means for shifting the polarization of light in said element.

* * * * *